United States Patent
Haas et al.

(10) Patent No.: US 10,872,732 B2
(45) Date of Patent: Dec. 22, 2020

(54) METHOD FOR PRODUCING ELECTRONIC COMPONENTS BY MEANS OF 3D PRINTING

(71) Applicant: TANIOBIS GMBH, Goslar (DE)

(72) Inventors: Helmut Haas, Boerssum (DE); Marcel Hagymasi, Goslar (DE); Kamil Paul Rataj, Duesseldorf (DE); Christoph Schnitter, Holle (DE); Markus Weinmann, Goslar (DE)

(73) Assignee: TANIOBIS GMBH, Goslar (DE)

( * ) Notice: Subject to any disclaimer, the term of this patent is extended or adjusted under 35 U.S.C. 154(b) by 0 days.

(21) Appl. No.: 16/331,529

(22) PCT Filed: Sep. 4, 2017

(86) PCT No.: PCT/EP2017/072113
§ 371 (c)(1),
(2) Date: Mar. 8, 2019

(87) PCT Pub. No.: WO2018/050473
PCT Pub. Date: Mar. 22, 2018

(65) Prior Publication Data
US 2019/0206629 A1    Jul. 4, 2019

(30) Foreign Application Priority Data

Sep. 15, 2016 (DE) .......................... 10 2016 011 098

(51) Int. Cl.
| | |
|---|---|
| *H01G 9/052* | (2006.01) |
| *B22F 3/105* | (2006.01) |
| *B33Y 10/00* | (2015.01) |
| *B33Y 80/00* | (2015.01) |
| *C22C 27/02* | (2006.01) |
| *B29C 64/153* | (2017.01) |
| *B22F 5/00* | (2006.01) |
| *C22C 1/04* | (2006.01) |

(52) U.S. Cl.
CPC .......... *H01G 9/052* (2013.01); *B22F 3/1055* (2013.01); *B29C 64/153* (2017.08); *B33Y 10/00* (2014.12); *B33Y 80/00* (2014.12); *C22C 27/02* (2013.01); *B22F 5/00* (2013.01); *B22F 2999/00* (2013.01); *C22C 1/045* (2013.01)

(58) Field of Classification Search
CPC .... H01G 9/048; H01G 2009/05; H01G 9/052; H01G 2009/0404; H01G 2009/0408; B33Y 10/00; B33Y 80/00
See application file for complete search history.

(56) References Cited

U.S. PATENT DOCUMENTS

| | | | |
|---|---|---|---|
| 4,520,430 | A | 5/1985 | Long et al. |
| 4,537,641 | A | 8/1985 | Albrecht et al. |
| 4,722,756 | A | 2/1988 | Hard |
| 2003/0058605 | A1 | 3/2003 | Keser |
| 2004/0134874 | A1 | 7/2004 | Hossick-Schott et al. |
| 2014/0285952 | A1 | 9/2014 | Otterstedt |
| 2015/0273631 | A1* | 10/2015 | Kenney .............. C22C 1/0416 419/53 |
| 2016/0008886 | A1 | 1/2016 | Peterson |
| 2016/0064150 | A1 | 3/2016 | Haas et al. |

FOREIGN PATENT DOCUMENTS

DE    10 2007 018 126 A1    10/2008

OTHER PUBLICATIONS

DIN 66139: "Pore size analysis—Representation of pore size distributions", pp. 1-25, (Mar. 2012).

* cited by examiner

*Primary Examiner* — Scott B Geyer
(74) *Attorney, Agent, or Firm* — Norman B. Thot

(57) ABSTRACT

A method for producing an electrical component via a 3D printing includes preparing a first layer which includes a valve metal powder, consolidating at least a portion of the valve metal powder of the first layer via a first selective irradiation with a laser, applying a second layer which includes the valve metal powder to the first layer, consolidating at least a portion of the valve metal powder of the second layer via a second selective irradiation with the laser so as to form a composite of the first layer and of the second layer, applying respective additional layers which include the valve metal powder to the composite, and consolidating at least a portion of the valve metal powder of the respective additional layers via a respective additional selective irradiation with the laser to thereby obtain the electrical component.

17 Claims, 1 Drawing Sheet

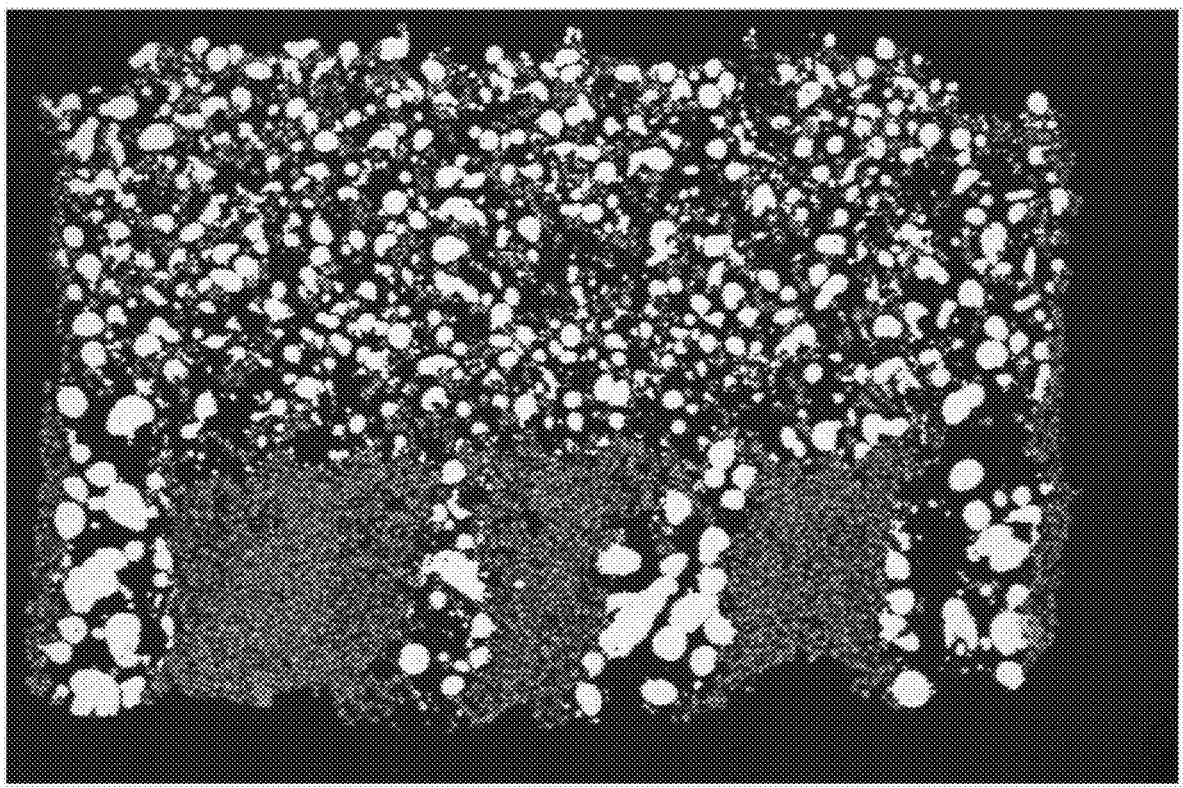

METHOD FOR PRODUCING ELECTRONIC COMPONENTS BY MEANS OF 3D PRINTING

CROSS REFERENCE TO PRIOR APPLICATIONS

This application is a U.S. National Phase application under 35 U.S.C. § 371 of International Application No. PCT/EP2017/072113, filed on Sep. 4, 2017 and which claims benefit to German Patent Application No. 10 2016 011 098.8, filed on Sep. 15, 2016. The International Application was published in German on Mar. 22, 2018 as WO 2018/050473 A1 under PCT Article 21(2).

FIELD

The present invention relates to a method for the production of electronic components and/or porous components, particularly anodes, from valve metal powder by means of 3D printing and the use of a valve metal powder for the production of electronic components and/or porous components by means of 3D printing. The present invention further relates to an anode that is obtainable by the method according the present invention and an electrical component, particularly a capacitor, that comprises the anode according to the present invention.

BACKGROUND

The increasing miniaturization of devices in information and communication electronics requires electronic components with a higher level of performance and with a more compact design. This in particular concerns capacitors that are used as passive elements for storage of electrical energy in electronic components such as smartphones, laptops, tablets, wearables and the like. There is thus a need for capacitors characterized not only by high energy storage density, but also by smaller overall size, particularly a small thickness.

Valve metals used to produce capacitors are generally characterized in that their oxides allow current to flow through in one direction when potential is increased, but to block the current flow in the other direction when it is decreased. A further property of valve metals is that they have a natural oxide layer that prevents further oxidation and thus spontaneous ignition of the metal.

Anodes composed of valve metals are ordinarily produced by pressing and sintering of suitable metal powders having fine-particulate primary structures or already having sponge-like secondary structures. Solidification usually takes place via solid-phase sintering at temperatures in the range of 1000° C. to 1500° C. The powder is pressed around a connecting wire in order to allow electrical contacting of the pressed bodies. The minimum thickness of the anode in this case is significantly limited by the diameter of the connecting wire. A problem in this production method is absorption of oxygen during the production process, which has a particularly negative effect on the hardness and/or ductility of the resulting anode. It has been found that a higher oxygen content in anodes leads to sharply impaired electrical properties of the resulting capacitor.

In order to deal with this problem, methods were developed to lower the oxygen content in anodes via reducing conditions.

For example, U.S. Pat. No. 4,722,756 describes a method for reducing the oxygen content of tantalum or niobium sintered bodies in which sintering is carried out in a hydrogen atmosphere in the presence of a reducing material. Proposed examples of the reducing material are beryllium, calcium, cerium, hafnium, lanthanum, lithium, praseodymium, scandium, thorium, titanium, uranium, vanadium, yttrium and zirconium, as well as mixtures and alloys thereof.

DE 3309891 describes a two-stage method for the production of sintered valve metal anodes in which already-sintered tantalum bodies are deoxidized in the presence of a reducing metal such as magnesium. The metal is introduced into a reaction chamber together with the sintered body therefor and simultaneously heated with the sintered body to temperatures of between 650° C. and 1150° C.

The methods described above have the drawback, however, that treatment impairs the bonding of the connecting wire to the anode. The strength with which the wire and the anode are connected to each other, the so-called wire pull strength, is, however, an important characteristic value, and insufficient bonding or low wire pull strength constitute a significant weakness in further processing of the capacitor, which can lead to mechanical failure of the capacitor.

An alternative method for the production of capacitors is printing of anodes composed of valve metals by application of metal-containing pastes to substrates. By applying thin layers to, for example, tantalum films, it is possible to obtain anodes that in some cases have a much lower thickness than that of conventionally produced components.

DE 102011116939 describes a method for the production of distortion-free anodes via screen or stencil printing on thin tantalum or niobium foils. The anodes produced by this method have a vertical dimension of 25 to 250 μm.

The pastes used are ordinarily systems comprising a plurality of components, such as metals, binders, solvents and optionally further additives. In order to prevent a negative effect on the electrical properties of the anode, these additives must, however, be removed after printing. This is usually carried out thermally, which requires an additional method step. Depending on the binders and/or solvents used, thermal treatment may cause them to decompose, but without allowing complete removal thereof. The result is that the metal powder has a higher carbon content, which negatively affects the electrical properties of the resulting anode. It is only after the additional step that sintering of the metal powder can be carried out analogously to conventional methods. An advantage of this production method is that one can dispense with a wire for contacting of the anode, as the substrate itself serves as the contact. The substrate makes no contribution to the capacitance of the capacitor, however, thus reducing the energy density of the component. The actual advantage of the valve metal, namely its high energy density, can therefore not be fully utilized.

None of the methods described above provides satisfactory results with respect to process efficiency and quality of the anodes produced.

US 2016/0008886 generally proposes a method for 3D printing in which metals, plastic, resins, and other materials can be used.

SUMMARY

An aspect of the present invention is to provide a method that allows the production of thin anodes without using solvents, binders or other auxiliaries and without conventional sintering.

In an embodiment, the present invention provides a method for producing an electrical component via a 3D printing which includes preparing a first layer comprising a valve metal powder, consolidating at least a portion of the valve metal powder of the first layer via a first selective irradiation with a laser, applying a second layer comprising the valve metal powder to the first layer, consolidating at least a portion of the valve metal powder of the second layer via a second selective irradiation with the laser so as to form a composite of the first layer and of the second layer, applying respective additional layers comprising the valve metal powder to the composite, and consolidating at least a portion of the valve metal powder of the respective additional layers via a respective additional selective irradiation with the laser to thereby obtain the electrical component. It was found that the drawbacks of the conventional production methods can be overcome thereby.

BRIEF DESCRIPTION OF THE DRAWINGS

The present invention is described in greater detail below on the basis of embodiments and of the drawing in which:

The FIGURE shows an anode composed of tantalum metal powder that was produced by the method according to the present invention.

DETAILED DESCRIPTION 3D printing or the 3D printing process within the meaning of the present invention describes the computer-controlled construction of three-dimensional workpieces layer by layer from a powder according to predetermined dimensions and shapes.

One aspect of the present invention is a method for the production of an electronic component via 3D printing comprising the following steps:
  a) preparation of a first layer comprising a valve metal powder;
  b) consolidation of at least a portion of the valve metal powder of the first layer by selective irradiation with a laser;
  c) application of a second layer comprising a valve metal powder;
  d) consolidation of at least a portion of the valve metal powder of the second layer by selective irradiation with a laser, causing a composite of the first and second layer to form;
  e) repetition of steps c) and d) to obtain the electronic component.

Consolidation within the meaning of the present invention is understood to refer to solidification of the powder particles via a melting or sintering process or a combination of these two process variants, causing a physical composite to form.

The method according to the present invention allows the production of electronic components of low thickness having specified structures. Advantageously, the shape of the component can be freely selected so that any connections, for example, for supplying and discharging of electricity, can be integrated into the component from the outset, obviating the need to add them subsequently, for example, by welding. This has been found to be particularly advantageous in the production of anodes in which electrical contacting is conventionally carried out via an anode connecting wire, with the integration of said wire into the anode body usually being associated with a loss of mechanical stability of the anode. In an embodiment of the method of the present invention, the electrical component can, for example, be an anode.

Valve metal powders are characterized by their high storage density and are particularly well-suited for use as energy storage in electronic components. The valve metal used in the method according to the present invention can, for example, be selected from the group composed of aluminum, bismuth, hafnium, niobium, antimony, tantalum, tungsten, molybdenum and zirconium, as well as mixtures and alloys thereof. The valve metal used can, for example, be tantalum or niobium, in particular tantalum. It was surprisingly found that the capacitance of the resulting capacitor can be significantly increased when anodes composed of tantalum or niobium are used.

It has been shown that the electrical properties and mechanical stability of an electronic component, particularly an anode, can be improved by adding further metals to the valve metal. In an embodiment of the method of the present invention, the valve metal can, for example, be present together with one or a plurality of further metals. The further metal can, for example, be selected from the group composed of germanium, magnesium, silicon, chromium, tin, titanium and vanadium, as well as mixtures and alloys thereof.

In the method according to the present invention, the consolidation of the valve metal powder is carried out by selective irradiation with a laser. It was found that the density of the electronic component can be controlled via suitable process control. Both porous, i.e., sponge-like structures, and compact structures with low porosity can be obtained thereby. In this case, careful adjustment of the laser is particularly decisive for the desired final result. In an embodiment of the present invention, an adjustment of the degree of consolidation of the powder can, for example, be carried out by the laser energy input.

In an embodiment of the method according to the present invention, irradiation with the laser can, for example, cause a sintering of the powder. Structures having a certain porosity are obtainable thereby. The presence of a porous structure is particularly important for anodes in which a large surface area is advantageous.

In an embodiment of the present invention, irradiation with the laser can, for example, cause the powder to melt. This has been found to be particularly advantageous in cases in which the mechanical stability of the electronic component is of primary importance.

In an embodiment of the present invention, the laser power input can, for example, be adjustable in a locally variable manner. It has surprisingly been shown that in this manner, it is possible to produce an electronic component, particularly an anode, that has locally differing densities. Adjustment of the laser power input can, for example, be carried out in a manner that allows for the formation of a density gradient in the x direction and/or the y direction of the electronic component. Adjustment can alternatively, for example, be carried out so that a local increase in the density of the component occurs. The density of the component at the connecting points of the electrical contact(s) can, for example, be greater than in the rest of the component. The method according to the present invention thereby allows the production of electronic components, for example, anodes, that have both high energy density and high wire pull strength.

The method according to the present invention thereby allows the production of sintered bodies having partial structures of different densities in which the contact points are already incorporated during the printing process. It is therefore possible to produce structures of any desired density or porosity. The volume ratio of anode to current conductor can also be selectively adjusted via the method according to the present invention.

It was surprisingly found that the best results are obtained when the laser power is in the range of 2 to 200 W. In an embodiment of the present invention, the laser power can, for example, be in the range of 2 to 200 W, for example, in the range of 5 to 100 W. In this case, the focus of the laser, which determines the local resolution, can, for example, be in the range of 1 to 200 µm, for example, in the range of 5 to 100 µm. Limiting the focus to the claimed range allows the production of complex structures without any negative effect on the electrical and mechanical properties of the component. The laser feed rate should also, for example, be 20 to 4000 mm/s, for example, 50 to 2000 mm/s. This makes it possible to achieve economically efficient process control with simultaneous high product quality.

In the production of an electronic component, particularly an anode, in addition to process control, the primary properties of the powder used, particularly its particle size, are important for the electrical properties. In an embodiment of the present invention, the valve metal powder used can, for example, have a particle size in the range of 5 to 120 µm, for example, in the range of 10 to 50 µm, for example, 25 to 45 µm. It was surprisingly found that powder with a particle size in the claimed range allows the production of an anode that is characterized both by excellent electrical properties and high mechanical stability.

The method according to the present invention is particularly well-suited for the production of thin anodes, with this production being carried out layer by layer from powder. In an embodiment of the present invention, the thickness of the first layer can, for example, be 5 to 100 µm, for example, 10 to 50 µm. Although the thickness of the individual layers may vary, an embodiment of the present invention provides that the thickness of the second layer approximately corresponds to that of the first layer and can be, for example, 5 to 100 µm, for example, 5 to 50 µm. This provides a homogenous structure of the anode, which in turn results in homogenous distribution of energy density.

The method according to the present invention is characterized in that complex three-dimensional structures of any desired shape are obtained from a powder layer by selective irradiation with a laser. Despite the complex structure, the powder layer can therefore have a simple geometric shape such as a rectangle, thus obviating the need for a complex template. As not all of the valve metal powder is consolidated by this process, an embodiment of the method according to the present invention provides that the method can, for example, comprise the further step of removing the unconsolidated powder from the finished component. This can be carried out, for example, mechanically or via an air stream. The unconsolidated powder can be recycled and returned to the process.

As mentioned above, conventional production methods have the drawback of requiring the use of binders and/or solvents, which must then be removed by complex means. In contrast thereto, the method according to the present invention does not require further additives. An embodiment of the present invention therefore provides that the use of further additives such as binders, solvents, sintering aids and the like can, for example, be dispensed with.

A further aspect of the present invention is the use of a valve metal powder for the production of an electronic component via 3D printing. The electronic component can, for example, be an anode. A further aspect of the present invention is the use of a valve metal powder for the production of a porous component via 3D printing. The valve metal powder can, for example, be used in a method according to the present invention.

In the production of porous components, the 3D printing method, specifically the method according to the present invention, is particularly advantageous. The porous components can have an open porosity of 20 to 80%, for example, 40 to 60%, measured according to DIN 66139. The mean pore size is in the range of 5 nm to 5 µm, for example, in the range of 30 nm to 4 µm, for example, in the range of 50 nm to 2 µm. The pore size distribution of the components in this case, measured, for example, by mercury porosimetry, may show one or more peaks, with mean pore diameters in the above ranges.

In an embodiment of the present invention, the valve metal can, for example, be selected from the group composed of aluminum, bismuth, hafnium, niobium, antimony, tantalum, tungsten, molybdenum and zirconium, as well as mixtures and alloys thereof. The valve metal can, for example, be tantalum or niobium, for example, tantalum.

In order to improve the electrical and mechanical properties of the electronic component, the valve metal may be present together with one or a plurality of further metals. The further metal can, for example, be selected from the group composed of beryllium, germanium, magnesium, silicon, tin, chromium and vanadium, as well as mixtures and alloys thereof.

The valve metal powder for the use according to the present invention can, for example, have a particle size in the range of 5 to 120 µm, for example, 10 to 50 µm, for example, 25 to 45 µm. It was surprisingly found that powders with a particle size in the claimed range are particularly well-suited for use in 3D printing processes and show favorable usability and processability.

Impurities in the valve metal powder used for the production of the electronic component often have a negative effect on electrical properties. The presence of carbon can, for example, cause an increase in the leakage current of the resulting capacitor due to deficient insulation between the anode and cathode. The valve metal powder used according to the present invention can therefore have a carbon content of, for example, less than 50 ppm. The carbon content can, for example, be in the range of 0.1 to 20 ppm.

The valve metal powder for the use according to the present invention can, for example, have a hydrogen content of less than 600 ppm, for example, 50 to 400 ppm. It was surprisingly found that the mechanical stability of the components can be increased by limiting the hydrogen content to the above values.

The nitrogen content of the powder used can, for example, be 5000 ppm or less, for example, in the range of 10-2000 ppm, for example, in the range of 10 to 1000 ppm. A nitrogen content outside of the indicated range negatively affects the electrical properties of the resulting capacitor and can also impair the processability of the powder in 3D printing.

Valve metals have a natural oxide layer that prevents spontaneous ignition of these powders. The valve metal powder for the use according to the present invention can, for example, have an oxygen content of 4000 ppm or less per $m^2$ of BET specific surface area of the powder, and, for example, an oxygen content in the range of 2000-3200 ppm per $m^2$ of BET specific surface area. It was surprisingly found that by limiting the oxygen content to the range according to the present invention, the charge separation between the cathode and anode can be improved, which leads to an increased storage capacity of the capacitor.

The valve metal powder in the use according to the present invention can, for example, have an iron content of 10 ppm or less, for example, 0.1 to 8 ppm. An iron content within the claimed range provides that the electrical properties of the resulting capacitor will not be impaired by the natural conductivity of the iron. In subsequent anodization in electrolytes, iron particles in or directly under the native oxide layer of the powder cause electrical breakthroughs through the oxide layer and make the component unusable as a capacitor.

The presence of potassium and sodium also has a negative effect on the electrical properties of a capacitor. The potassium content of the powder used according to the present invention can, for example, be less than 20 ppm, for example, in the range of 0.1 to 10 ppm. The sodium content of the valve metal powder can, for example, be 10 ppm or less, for example, 0.1 to 8 ppm. In subsequent anodization in electrolytes, potassium and sodium compounds in or directly under the native oxide layer of the powder cause electrical breakthroughs through the oxide layer and make the component unusable as a capacitor.

The content of nickel in the valve metal powder can, for example, be 20 ppm or less, for example, 0.1 to 10 ppm. In subsequent anodization in electrolytes, nickel particles in or directly under the native oxide layer of the powder cause electrical breakthroughs through the oxide layer and make the component unusable as a capacitor.

In an embodiment of the present invention, the valve metal powder used according to the present invention can, for example, contain phosphorus. The phosphorus content in this case can, for example, be 300 ppm or less, for example, 10 to 250 ppm. It was surprisingly found that the sintering activity of the valve metal powder can be adjusted via the phosphorus content, with a phosphorus content greater than the claimed range leading to an undesirable loss of storage capacity of the resulting capacitor.

A valve metal powder can, for example, be used in the present invention that has a degree of purity of 99%, for example, 99.9%, for example, 99.99% or more. In an embodiment of the present invention, the valve metal powder can, for example, have the following composition, with the figures in ppm indicating mass fractions:

carbon in an amount of less than 50 ppm, for example, 0.1 to 20 ppm;
hydrogen in an amount of less than 600 ppm, for example, 50 to 400 ppm;
nitrogen in an amount of less than 5000 ppm, for example, 500 to 2000 ppm;
oxygen in an amount of less than 4000 ppm per $m^2$, for example, 2000 to 3800 ppm;
iron in an amount of less than 10 ppm, for example, 0.1 to 8 ppm;
potassium in an amount of less than 20 ppm, for example, 0.1 to 10 ppm;
sodium in an amount of less than 10 ppm, for example, 0.1 to 8 ppm;
nickel in an amount of less than 20 ppm, for example, 0.1 to 10 ppm;
chromium in an amount of less than 10 ppm, for example, 0.1 to 8 ppm;
magnesium in an amount of less than 150 ppm, for example, 0.1 to 120 ppm;
phosphorus in an amount of less than 300 ppm, for example, 50 to 200 ppm; and
silicon in an amount of less than 20 ppm, for example, 0.1 to 8 ppm.

It was surprisingly found that such a powder is particularly well-suited for use in the production of electronic components via 3D printing.

In an embodiment of the present invention, the valve metal powder can, for example, have a bulk density of at least 1.5 g/cm$^3$, with the flow behavior of 25 g of powder through a 0.38 cm (0.15 inch) funnel at a flow rate of at least 0.5 g/s being less than 60 s, for example, 30 s, for example, 10 s. It has surprisingly been found that powders having a corresponding flow rate have particularly favorable processability in 3D printing methods.

The amount of electrical energy that can be stored in a capacitor is determined, among other factors, by the surface area of the powder used. The greater the surface area, the greater the capacitance of the capacitor. A particularly high surface area of the powder usually results from a small particle diameter combined with a high degree of open porosity. When particle diameters are too small, the metallic particles are completely converted to oxide during anodization and no longer make any contribution to capacitance (over-formation). In an embodiment of the present invention, the valve metal powder can, for example, have a BET surface area of 0.001 to 10 $m^2$/g, for example, 0.001 to 5 $m^2$/g, for example, 0.001 to 3 $m^2$/g, for example, 0.01 to 1 $m^2$/g.

The method according to the present invention is particularly well-suited for the production of anodes. A further subject of the present invention is therefore an anode that is obtainable by the method according to the present invention. The anode according to the present invention can, for example, have an anode connecting wire. This anode connecting wire can, for example, be formed simultaneously with the printing of the anode and integrated therein. In an embodiment of the present invention, the anode connecting wire can, for example, be formed by melting of a corresponding area of the valve metal powder layer. The density of the anode at the connection point of the anode connecting wire can, for example, be greater than in the rest of the anode. A reliable electrical connection is thereby provided without there being any negative effect on energy storage density.

The method according to the present invention makes it possible to selectively control the density of the anode via corresponding process control. The anode according to the present invention therefore can, for example, have a density gradient in the x direction and/or the y direction. The anode thereby shows higher energy storage density and higher wire strength. The anode according to the present invention can, for example, have a porosity of at least 20% based on the total volume of the printed body. Porosity can, for example, be determined by mercury porosimetry.

The method according to the present invention is particularly well-suited for the production of thin anodes. An embodiment of the present invention therefore provides that the anode can, for example, have a thickness of 5 to 500 μm, for example, 10 to 300 μm and, for example, 20 to 100 μm. Anodes with this thickness are particularly well-suited for use in mobile devices which are required to show high performance.

A further aspect of the present invention is a capacitor that comprises the anode according to the present invention. The capacitor can, for example, be obtained by electrolytic oxidation of the surface of the anode according to the present invention into an amorphous metal oxide such as $Ta_2O_5$ or $Nb_2O_5$. The thickness of the oxide layer, which acts as a dielectric, is determined in this case by the maximum voltage used in electrolytic oxidation, referred to as the forming voltage. The counter electrode, i.e., the cathode, is applied by impregnation of the sponge-like anode, for example, with manganese nitrate, which is thermally converted to manganese dioxide. The cathode can alternatively be formed by impregnation of the anode with a liquid precursor of a polymer electrolyte and optionally subsequent polymerization thereof. Contacting of the electrodes can be carried out on the cathode side via a laminar construction of graphite and conductive silver on the current conductors.

The present invention will be explained in greater detail below with reference to the following example, however, this is not to be construed as limiting the idea of the present invention.

Tantalum and niobium powders were used for production that have a degree of purity of at least 99.9% based on the metal content. The content of impurities is summarized in Table 1 below.

TABLE 1

| Element | Maximum Value in ppm (for oxygen in ppm/m$^2$) |
|---|---|
| C | 20 |
| H | 600 |
| N | 5000 |
| O | 4000 |
| Fe | 10 |
| K | 20 |
| Na | 10 |
| Cr | 10 |
| Mg | 150 |
| P | 300 |
| Si | 20 |

Suitable powders are available in various qualities from the H.C. Starck Tantalum und Niobium GmbH, Germany.

The commercially available laser system TruPrint 1000 from Trumpf, Germany was used for solidification of the metal powder.

The valve metal powder is first placed in a reservoir and then supplied in portions to the working platform. The powder is uniformly distributed over the working platform using a doctor blade or a roller and selectively irradiated with a laser. With high laser power and a fairly long exposure time, the powder melts, causing a dense, largely pore-free structure to form. If the energy input is low, the powder is sintered, with the laser energy input being adjusted so that the temperature of the powder bed is slightly below the melting temperature of the powder. Under these conditions, rapid diffusion in the solid and binding of the particles along their surface are possible, so that the porous inner structure of the particles remains intact. After irradiation of the first layer, the second layer is applied and also selectively irradiated with a laser so that the first and second layer are bonded together by a sintering process. This process is repeated until the desired thickness is achieved. The finished anode is removed from the working platform, and excess powder is removed therefrom.

The FIGURE shows an anode composed of tantalum metal powder that was produced by the method according to the present invention. The differences in density within the anode can clearly be seen. Three areas of very high porosity are located in the lower part of the anode. These are residues of non-irradiated powder from the powder bed. The remaining area in the lower part shows larger molten particles of differing density. The four structures pointing downwards serve as contact terminals for the capacitor. In the upper part of the anode, an extensive area (approximately 60% of the entire body) that has large porous portions can be seen.

The present invention is not limited to embodiments described herein; reference should be had to the appended claims.

What is claimed is:

1. A method for producing an electrical component via a 3D printing, the method comprising:
   preparing a first layer comprising a valve metal powder;
   consolidating at least a portion of the valve metal powder of the first layer via a first selective irradiation with a laser;
   applying a second layer comprising the valve metal powder to the first layer;
   consolidating at least a portion of the valve metal powder of the second layer via a second selective irradiation with the laser so as to form a composite of the first layer and of the second layer;
   applying respective additional layers comprising the valve metal powder to the composite; and
   consolidating at least a portion of the valve metal powder of the respective additional layers via a respective additional selective irradiation with the laser,
   to thereby obtain the electrical component,
   wherein,
   the valve metal powder is selected from aluminum, bismuth, hafnium, niobium, antimony, tantalum, tungsten, molybdenum and zirconium, and mixtures and alloys thereof, and
   the valve metal powder comprises a BET surface area of 0.001 to 10 m$^2$/g.

2. The method as recited in claim 1, wherein the electrical component is an anode.

3. The method as recited in claim 1, wherein the first selective irradiation with the laser and the additional selective irradiations with the laser causes at least one of a sintering and a melting of the valve metal powder.

4. The method as recited in claim 1, wherein the method does not include a use of further additives.

5. The method as recited in claim 4, wherein the further additives not included in the method comprise at least one of at least one binder and at least one solvent.

6. The anode produced pursuant to the method as recited in claim 2.

7. The anode as recited in claim 6, wherein the anode comprises a density gradient in at least one of an x direction and a y direction.

8. The anode as recited in claim 6, wherein the anode comprises a thickness of 5 to 500 μm.

9. The anode as recited in claim 6, wherein a density of the anode at a connecting point of an anode connecting wire is greater than in a rest of the anode.

10. An electrical component comprising the anode as recited in claim 6.

11. The electrical component as recited in claim 10, wherein the electrical component is a capacitor.

12. A method of using a valve metal powder to produce an electrical component via a 3D printing, the method comprising:
   providing the valve metal powder; and
   using the valve metal powder in the 3D printing to produce the electrical component,
   wherein,
   the valve metal powder comprises a BET surface area of 0.001 to 10 m$^2$/g.

13. The method as recited in claim 12, wherein the electrical component is at least one of an anode and a porous component.

14. The method of using as recited in claim 13, wherein the porous component comprises an open porosity of 20 to 80%, measured according to DIN 66139 as published in March 2012.

15. The method of using as recited in claim 12, wherein the valve metal powder is selected from aluminum, bismuth, hafnium, niobium, antimony, tantalum, tungsten, molybdenum and zirconium, and mixtures and alloys thereof.

16. The method of using as recited in claim 12, wherein the valve metal powder comprises a particle size in the range of 5 to 120 μm.

17. The method of using as recited in claim 12, wherein the valve metal powder comprises a degree of purity of >99.9% relative to a metal content.

\* \* \* \* \*